US006881108B2

(12) United States Patent
Lin (10) Patent No.: US 6,881,108 B2
(45) Date of Patent: Apr. 19, 2005

(54) SYSTEM FOR PREVENTING AN AUTOMOBILE FROM BEING IMMERSED IN WATER

(76) Inventor: Yu-Tsai Lin, 9, Wen-Fu, Wen-Shan Li, Miao-Li (TW)

( * ) Notice: Subject to any disclaimer, the term of this patent is extended or adjusted under 35 U.S.C. 154(b) by 3 days.

(21) Appl. No.: 10/633,527

(22) Filed: Aug. 5, 2003

(65) Prior Publication Data

US 2005/0032443 A1 Feb. 10, 2005

(51) Int. Cl.[7] ................................................ B60F 3/00
(52) U.S. Cl. .................... 440/12.51; 114/68; 114/360; 441/80
(58) Field of Search .................... 441/80, 136; 114/68, 114/360; 440/12.5, 12.51, 12.53, 12.57, 12.58, 440/12.59, 12.6, 12.61

(56) References Cited

U.S. PATENT DOCUMENTS

| 2,421,679 A | * | 6/1947 | Bingham, Jr. ............... 114/345 |
| 3,126,559 A | * | 3/1964 | Alexander ..................... 441/2 |
| 5,113,779 A | * | 5/1992 | Amrein et al. ........... 440/12.63 |
| 5,150,662 A | * | 9/1992 | Boyd et al. .................... 114/68 |
| 6,070,546 A | * | 6/2000 | Downey et al. ............. 114/123 |
| 2003/0197599 A1 | * | 10/2003 | Kim ........................ 340/425.5 |

FOREIGN PATENT DOCUMENTS

FR          1.499.238       * 10/1967

* cited by examiner

Primary Examiner—Sherman Basinger
(74) Attorney, Agent, or Firm—Rosenberg, Klein & Lee

(57) ABSTRACT

The present invention relates to a system to float an automobile on water. The system comprises holder assemblies, a detecting sensor, a pneumatic system, envelopes, a propulsive system, and a steering system. The holder assemblies are fixed on the beams of the automobile. The pneumatic system is connected to air inlets of the envelopes with pipes and to a battery with a circuit. The envelopes are fixed at the holder assemblies. When the pneumatic system operates, the envelopes expand to float the automobile on water. The detecting sensor connects to the pneumatic system, the battery, and a first switch with circuits. The propulsive system connects to the battery and a second switch with circuits. The steering system comprises two steering boards that are fixed on fellies of the automobile.

37 Claims, 7 Drawing Sheets

SYSTEM FOR PREVENTING AN AUTOMOBILE FROM BEING IMMERSED IN WATER

BACKGROUND OF THE INVENTION

1. Field of the Invention

The present invention relates to a system fixing on an automobile, and more particularly, to a system for preventing an automobile from being immersed in water.

2. Description of the Prior Art

Most of people drive automobiles to go where they want. The elements of the automobile become more precise and complex as fast as the science develops. The decoration of the automobile promotes to satisfy and to be convenient for the driver of the automobile. The elements with the microcomputer are always set on the automobile to operate the automobile. If the elements with the microcomputer are immersed in water, the elements will be broken due to water. For example, the automobile cannot be driven after the engine of the automobile being immersed in water. So that the driver dilates the lifetime of the automobile by preventing the engine from moisture and water.

The automobile is usually manufactured without setting elements of preventing the automobile from being immersed in water in the prior art. The automobile may be immersed in water if water is reserved on the parking place where the automobile is parked. When the water level is higher than the exhaust pipe of the automobile, water flows into the engine through the exhaust pipe. When the water level is higher than the bottom of the door, water flows inside cab of the automobile to immerse the decorations that cannot repel water, i.e. the audio and seats etc. The elements of the automobile such as the engine, the audio, seats and so forth will be broken when water immerses the elements. The elements that were operated by the microcomputer and were immersed in water have to be reconstructed or replaced to recuperate the basic operation of the automobile. The immersed decorations set inside the automobile may be replaced totally after the automobile being immersed in water. The immersed automobiles loss the money of the drivers and confuse the drivers. Furthermore, the immersed automobiles waste the societal resources such as the labor cost and natural resources and increase the problems of the environmental protection.

Furthermore, most portions of the body of the automobile are usually manufactured by metal, so that the most portions of the body of the automobile are more easily corroded after immersed.

According to the above description, it is necessary to develop a system to prevent the automobile from being immersed in water.

SUMMARY OF THE INVENTION

According to the above description of the background of the invention, it is one objective of the present invention to provide a system for preventing an automobile from being immersed in water to avoid loss in an immersed automobile.

It is an another objective of the present invention to provide a system for preventing an automobile from being immersed in water to dilate the lifetime of the automobile.

It is a further objective of the present invention to provide a system for preventing an automobile from being immersed in water to increase the recreational ability of the automobile.

The present invention provides a system for preventing an automobile from being immersed in water to avoid loss in an immersed automobile. The system of the present invention comprises holder assemblies, a detecting sensor for detecting the water level, a pneumatic system, envelopes, a propulsive system using in water, and a steering system using in water. The holder assemblies are usually fixed on the beams of the automobile, wherein the beams parallel with each other. The pneumatic system is connected to air inlets of the envelopes with pipes and is connected to a battery of the automobile with a first circuit. The envelopes are fixed at the bottoms of the holder assemblies. When the pneumatic system operates, the envelopes start to expand to let the automobile float on water, wherein the envelopes comprise exhaust valves. The detecting sensor connects to the pneumatic system with a second circuit and connects to the battery with a third circuit. The detecting sensor further connects to a first switch with a fourth circuit. The propulsive system using in water connects to the battery with a fifth circuit and connects to a second switch with a sixth circuit. The steering system using in water comprises a first steering board and a second steering board, wherein the first steering board and the second steering board is fixed on a first felly and a second felly of the automobile respectively. The driver inserts the key to turn on the automobile, the detecting sensor receives a signal transported from the third circuit and than stops detecting the water level and expanding the envelopes while driving. The detecting sensor receives another signal transported from the third circuit and then starts detecting the water level to prevent the automobile from being immersed in water when the automobile is parked and is turned off. If the detecting sensor detects the water level being too high, the detecting sensor transported a first operating signal to the pneumatic system through the second circuit to float the automobile. Namely, the first operating signal is transported to the pneumatic system when the exhaust pipe of the automobile or the bottom of the door is going to be immersed. The pneumatic system obtains the electric power from the battery of the automobile through the first circuit to replenish the envelopes when receives the first operating signal. The envelopes expand to float the automobile and prevent the automobile from being immersed in water due to air replenished from the air inlets that connect to the pneumatic system with the pipes. When the automobile has floated on water due to the envelopes, the driver of the automobile could press the second switch to operate the propulsive system. The battery provides power to operate the propulsive system through the fifth circuit after the propulsive system receiving the second operating signal through the sixth circuit. The envelopes float the automobile and the propulsive system propels the automobile floated on water. The driver controls the steering wheel for controlling the steering system to drive the automobile to a dry place to avoid loss due to an immersed automobile. The driver could press the first switch to operate the pneumatic system to rapidly replenish the envelopes and float the automobile while the automobile being turned on. The driver could effuse air stored inside the envelopes from the exhaust valves of the envelopes to store and reuse the envelopes after the automobile being parked on a dry place. The pneumatic system further includes a pressure sensor for sensing the pressure inside the envelopes. The pneumatic system stops replenishing the envelopes to prevent the envelopes from broken when the pressure inside the envelopes increases upon a predetermined pressure. The system of the present invention could be set on an automobile without a steering system and a propulsive system to save money of the driver.

The system of the present invention not only prevents an automobile from being immersed in water to avoid loss in an immersed automobile but also floats the automobile on the water to increase the recreational ability of the automobile.

All these advantageous features as well as others that are obvious from the following detailed description of preferred embodiments of the invention are obtained.

DESCRIPTION OF THE PREFERRED EMBODIMENT

In the present disclosure, the words "a" or an are to be taken to include both the singular and the plural. Conversely, any reference to plural items shall, where appropriate, include the singular.

The preferred embodiment of the present invention provides a system for preventing an automobile from being immersed in water to improve the disadvantages in the prior art. Nonetheless, it should be recognized that the present invention can be practiced in a wide range of other embodiments besides those explicitly described, and the scope of the present invention is expressly not limited except as specified in the accompanying claims.

The present invention provides a system for preventing an automobile from being immersed in water to avoid loss in an immersed automobile. The system comprises holder assemblies, a detecting sensor for detecting the water level, a pneumatic system, envelopes, a propulsive system using in water, and a steering system using in water.

Figure 1:
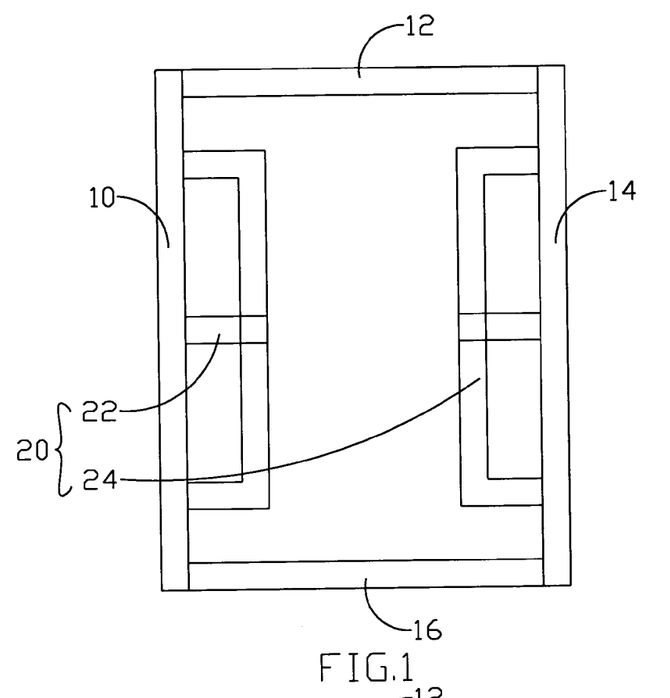
FIG. 1 is a top view of holder assemblies being fixed on beams that parallel with each other.
Figure 2:
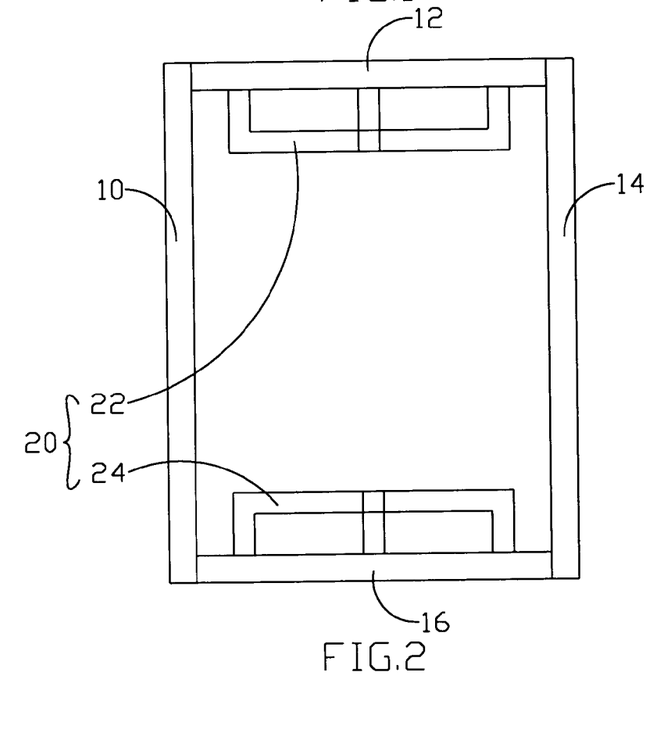
FIG. 2 is a top view of holder assemblies being fixed on beams that parallel with each other.
Figure 3:
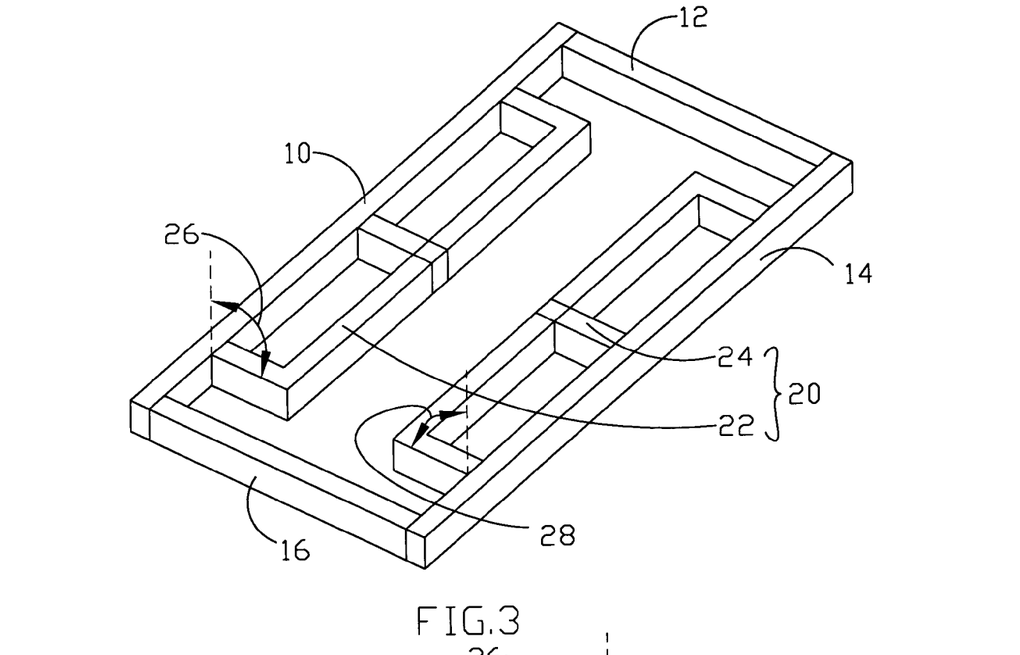
FIG. 3 is a three-dimensional perspective view of holder assemblies being fixed on beams that parallel with each other.
Figure 4:
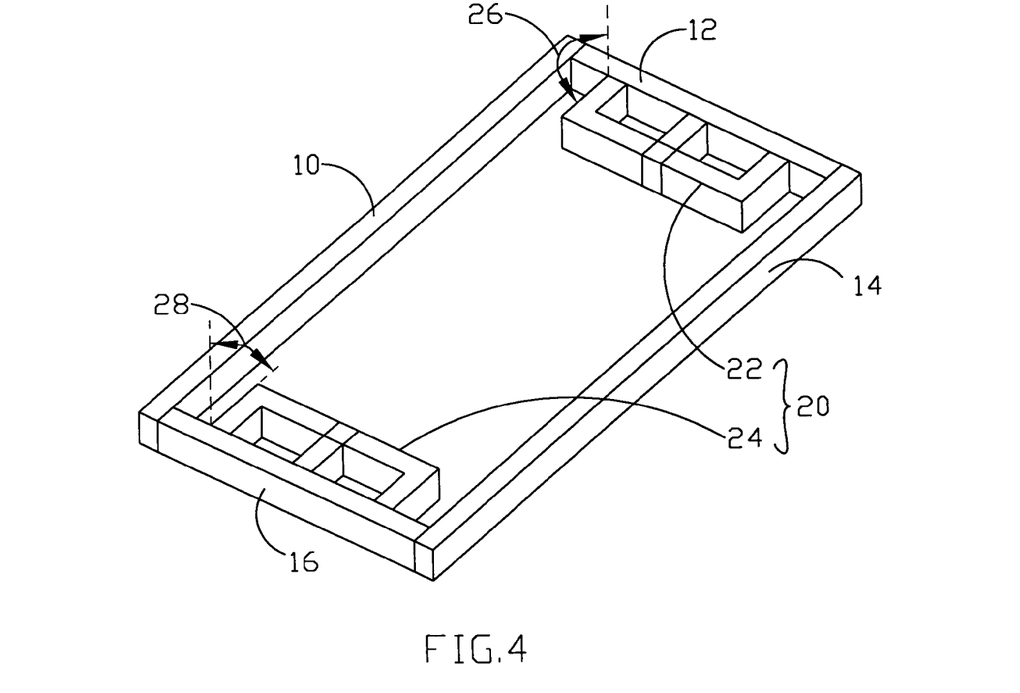
FIG. 4 is a three-dimensional perspective view of holder assemblies being fixed on beams that parallel with each other.

The top view of holder assemblies 20 of the first embodiment is shown in FIG. 1. The top view of the second embodiment of holder assemblies 20 is shown in FIG. 2. The three dimensional view of the first embodiment of the present invention is shown in FIG. 3 when the holder assemblies 20 are fixed on a first beam 10 and a second beam 14 of an automobile respectively. The three dimensional view of the second embodiment of the present invention is shown in FIG. 4 when the holder assemblies 20 are fixed on a first beam 12 and a second beam 16 of an automobile respectively. In the first embodiment the holder assemblies 20 include a first holder 22 and a second holder 24 to fix envelopes. The first holder 22 is preferred to fix on a first beam 10 of the automobile with a first angle 26. The second holder 24 is preferred to fix on a second beam 14 of the automobile with a second angle 28. The first beam 10 may parallel the second beam 14. The first angle is preferred to equal the second angle, wherein the first angle and the second angle is 90°. In the second embodiment the holder assemblies 20 include a first holder 22 and a second holder 24 to fix envelopes. The first holder 22 is preferred to fix on a first beam 12 of the automobile with a first angle 26. The second holder 24 is preferred to fix on a second beam 16 of the automobile with a second angle 28. The first beam 12 may parallel the second beam 16. The first angle is preferred to equal the second angle, wherein the first angle and the second angle is 90°.

Figure 5:
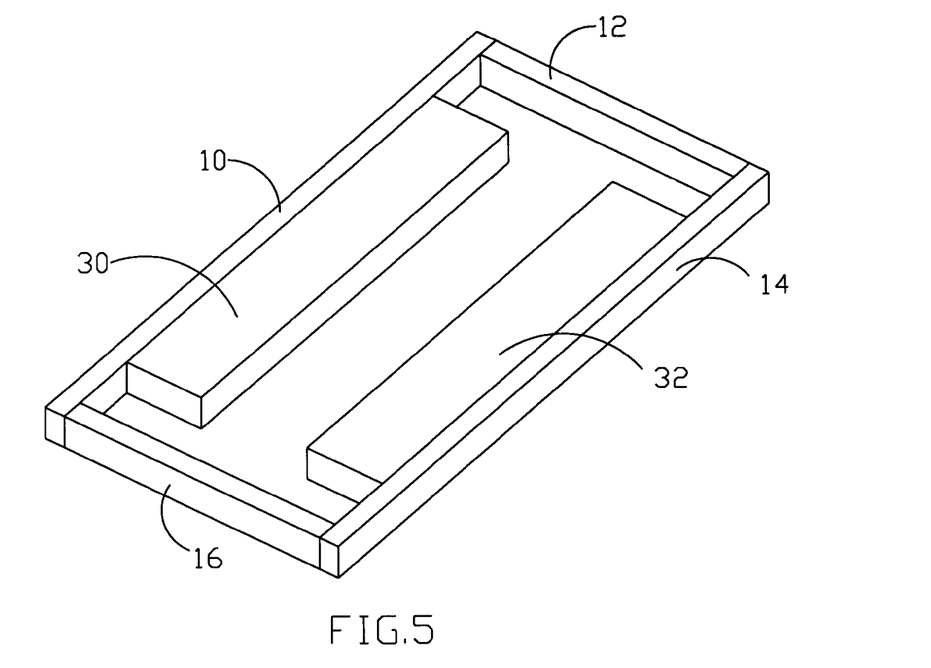
FIG. 5 is a three-dimensional perspective view of plates that replace the holder assemblies and are fixed on beams that parallel with each other.
Figure 6:
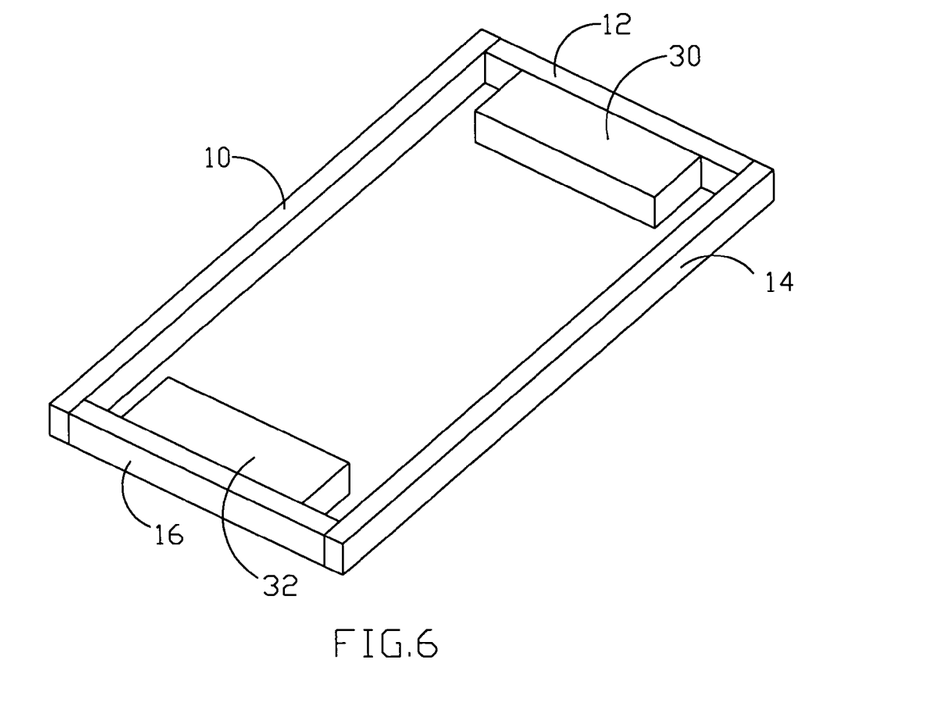
FIG. 6 is a three-dimensional perspective view of plates that replace the holder assemblies and are fixed on beams that parallel with each other.
Figure 7:
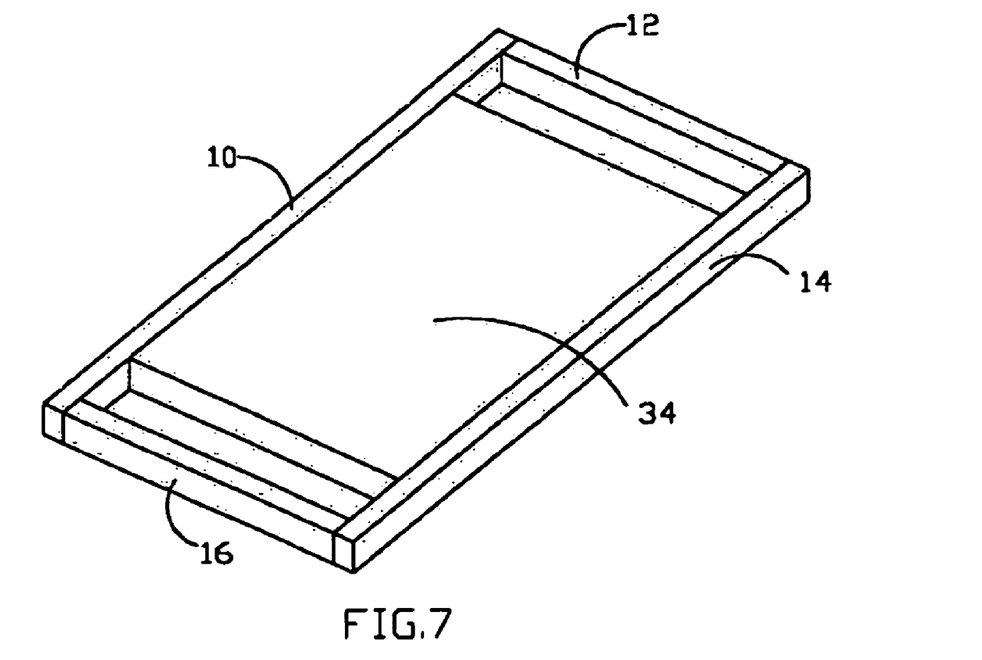
FIG. 7 is a three-dimensional perspective view of a single plate that replaces a single holder.

An only holder may replace the first holder 22 and the second holder 24 of the present invention. The single holder is fixed on the beams that parallel to each other of the automobile to support and fix envelopes. Plates could replace the holder assemblies 20 when the different automobile is manufactured. For example, in the third embodiment of the present invention, a first plate 30 replacing the first holder 22 an fixing on the first beam 10 to support and fix envelope as shown in FIG. 5. A second plate 32 replacing the second holder 24 and fixing on the second beam 14 to support and fix envelope as shown in FIG. 5. In the fourth embodiment of the present invention, a first plate 30 replacing the first holder 22 and fixing on the first beam 12 to support and fix envelope as shown in FIG. 6. A second plate 32 replacing the second holder 24 and fixing on the second beam 16 to support and fix envelope as shown in FIG. 6. Furthermore, a single plate may replace the single holder of the present invention. For example, the first plate 30 and the second plate 32 may be just replaced by a third plate 34, a single plate as shown in FIG. 7.

Figure 8:
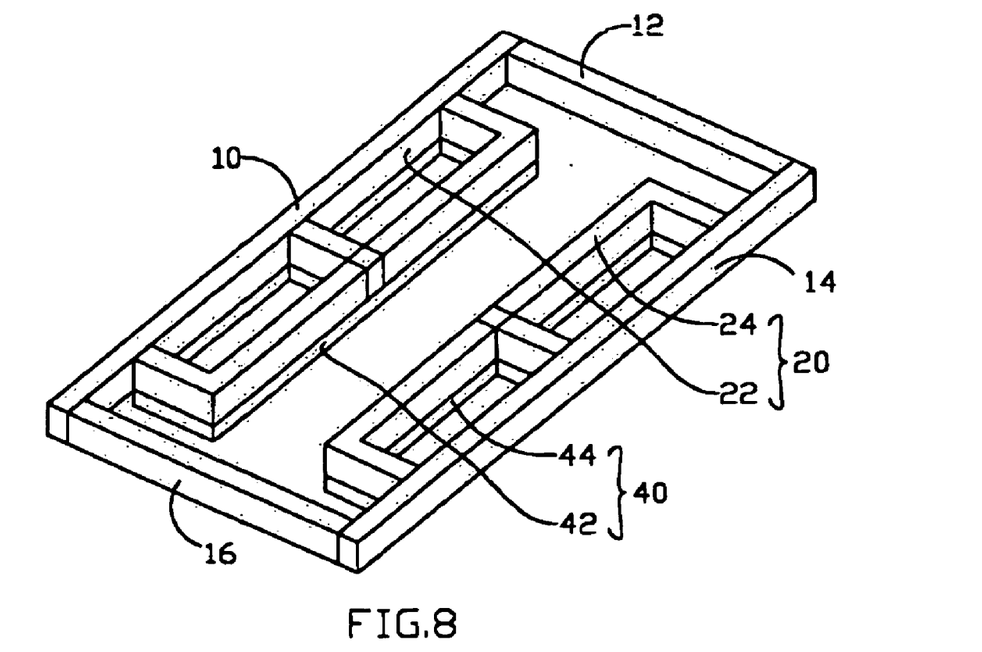
FIG. 8 is a three-dimensional perspective view of envelopes being fixed on the holder assemblies.

As shown in FIG. 8, a first envelope 42 is fixed at the bottom of the first holder 22 and a second envelope 44 is fixed at the bottom of the second holder 24. When the automobile is parking or runs on a road, the first envelope 42 and the second envelope 44 are closer to the road than the first holder 22 and the second holder 24 are. The material of envelopes 42 and 44 is elastic material, i.e. a rubber. The envelopes 42 and 44 are compressed to be very small for being stored when the envelopes 42 and 44 are empty. The first envelope 42 includes an air inlet and an exhaust valve. The second envelope 44 includes an air inlet and an exhaust valve, too. The envelopes 42 and 44 will expand very soon while replenishing air into the envelopes 42 and 44 through the air inlets if the user needs. The envelopes 42 and 44 could be compressed very soon for storing while exhausting air from the exhaust valves of envelopes 42 and 44. The user uses the system of the present invention without the economy waste because the envelopes 42 and 44 are reusable. Quantities of envelopes of the present invention change while the design of the automobile changes. For example, there are two envelopes to be fixed on the automobile to balance the automobile of the preferred embodiments discussed above. The first envelope includes a first air inlet and a first exhaust valve. The second envelope includes a second air inlet and a second exhaust valve. The first envelope and the second envelope are fixed at the bottom of the beams that parallel to each other of the automobile.

Figure 9:
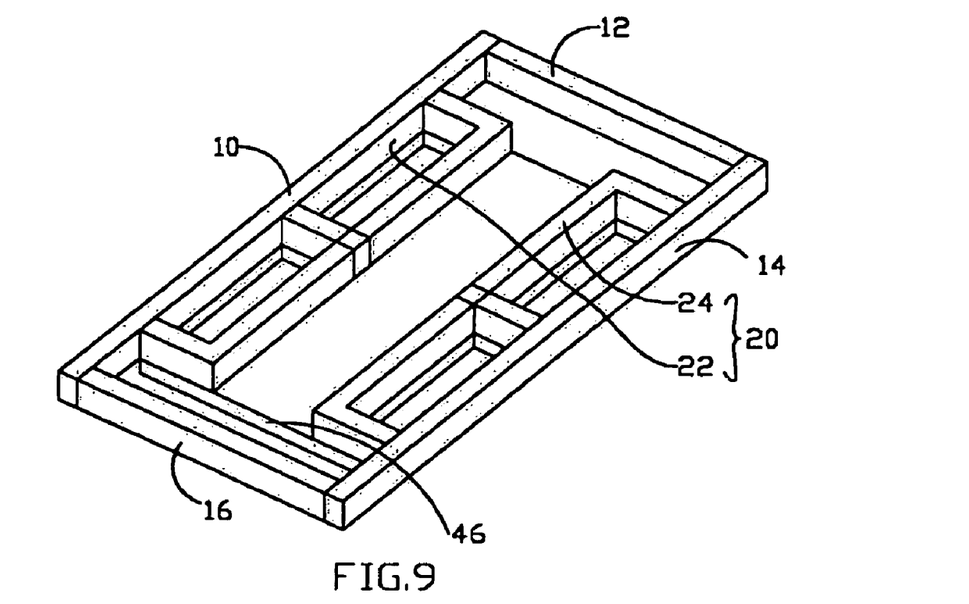
FIG. 9 is a three-dimensional perspective view of a single envelope that fixed under the bottoms of the beams.

The first envelope and the second envelope may be just replaced by a third envelope. For example, referring to FIG. 9, a third envelope 46 may be fixed at the bottom of the beams that parallel to each other of the automobile to prevent itself from being immersed in water, wherein the sides of the third envelope 46 are fixed nearly on the beams that parallel to each other of the automobile. An automobile of the present invention may also be fixed three envelopes under the bottoms of the beams of the automobile. For example, a first envelope is fixed on a first holder fixed on a first beam of the automobile. A second envelope is fixed on a second holder fixed on a second beam that parallels to the first beam of the automobile. A third envelope is fixed on a third holder fixed on a third beam of the automobile, wherein the third beam connects with the first beam and the second beam. Furthermore, an automobile may be fixed four envelopes under the bottoms of the beams, wherein a first envelope is fixed on a first holder fixed on a first beam of the automobile. A second envelope is fixed on a second holder fixed on a second beam that parallels to the first beam of the automobile. A third envelope is fixed on a third holder fixed on a third beam of the automobile. A fourth envelope is fixed on a fourth holder fixed on a fourth beam of the automobile. Both of the third beam and the fourth beam connect with the first beam and the second beam, wherein the third beam parallels to the fourth beam. Envelopes fixed on the automobile float the automobile on the water for preventing the automobile from being immersed in water. Quantities of the envelopes of the present invention change when the design of the automobile changes.

Figure 10:
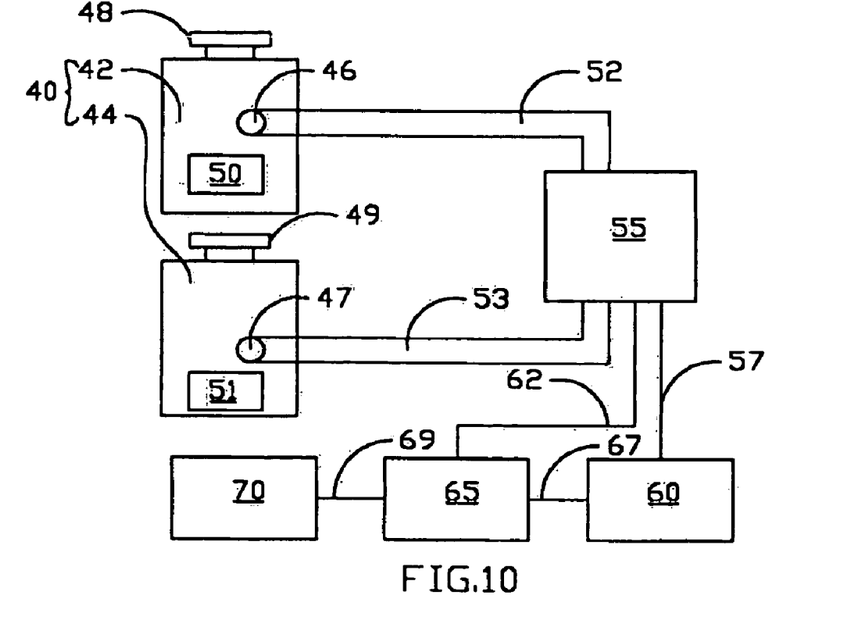
FIG. 10 is a schematic drawing of some elements connected to each other.

Some elements of the present invention connect to each other as shown in FIG. 10. The system of the present invention comprises a pneumatic system 55, a detecting sensor 65, and a first switch 70. The pneumatic system 55 connects to the first air inlet 46 of the first envelope 42 through a first pipe 52 and connects to the second inlet 47 of the second envelope 44 through second pipe 53. And the first envelope 42 and the second envelope 44 are equipped with exhaust valves 48 and 49 for exhausting air from them when necessary. The pneumatic system 55 further connects to a battery 60 of the automobile with a first circuit 57. The detecting sensor 65 connects to the pneumatic system 55 with a second circuit 62 and connects to the battery 60 with a third circuit 67. The detecting sensor 65 further connects to a first switch 70 with a fourth circuit 69. The detecting sensor 65 detects the distance between the surface of water and the exhaust pipe of the automobile and the distance between the surface of water and the bottom of the door of the automobile. The pneumatic system 55 is preferred to be an air-replenishing machine operated by electric power. The first envelope 42 and the second envelope 44 expand when the pneumatic system 55 replenishes air to the first air inlet 46 through the first pipe 52 and to the second envelope 44 to the second air inlet 47 through the second pipe 53. When the user of the automobile presses the first switch 70 by hand, the detecting sensor 65 operates. The pneumatic system 55 further includes pressure sensors 50 and 51 for sensing the pressure inside the first envelope 42 and the second envelope 44. The pneumatic system 55 stops replenishing the envelopes 42 and 44 to prevent the envelopes 42 and 44 from exploding when the pressure inside the envelopes 42 and 44 increases upon a predetermined pressure. Different automobile is fixed on different quantities of the detecting sensor and different quantities of the pressure sensor.

The driver inserts the key to turn on the automobile, the detecting sensor 65 receives a signal transported from the third circuit 67 and then stops detecting the water level and expanding the envelopes while driving. The detecting sensor 65 receives another signal transported from the third circuit 67 and starts detecting the water level to prevent the automobile from being immersed in water when the automobile is parked and is turned off. If the detecting sensor 65 detects the water level being too high, the detecting sensor 65 transported a first operating signal to the pneumatic system through the second circuit 62 to float the automobile. Namely, the first operating signal is transported to the pneumatic system when the exhaust pipe of the automobile or the bottom of the door is going to be immersed. The pneumatic system obtains the electric power from the battery 60 of the automobile through the first circuit 57 to replenish the envelopes when receives the first operating signal. The envelopes expand to float the automobile and prevent the automobile from being immersed in water due to air replenished from the air inlets that connect to the pneumatic system with the pipes.

Figure 11:
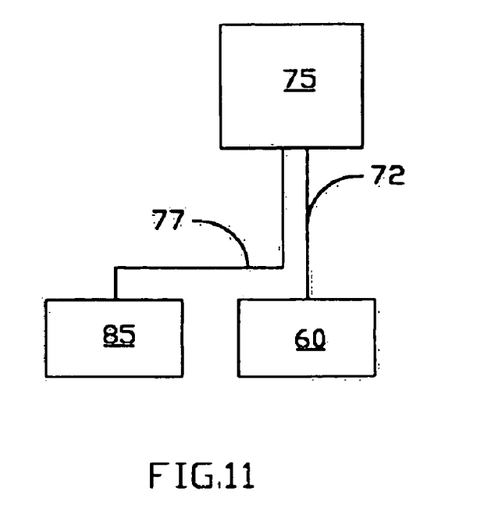
FIG. 11 is a schematic drawing of some elements connected to each other.

Some elements connect to each other as shown in FIG. 11. The system of the present invention further includes a propulsive system 75 of using in water, a steering system of using in water and a second switch 85. The propulsive system 75 connects to the battery 60 of the automobile with a fifth circuit 72 and connects to the second switch 85 with a sixth circuit 77. The propulsive system 75 usually comprises an electromotor and a propeller. The driver could set the propulsive system 75 that may be stored in the boot of the automobile under the boot to operate it for removing the floating automobile. The propulsive system 75 may be set under the boot by hand or by machine operating. The propulsive system 75 may be stored in the boot of the automobile to protect itself when the automobile runs on a road. The steering system guides the automobile on water according to the steering wheel. The steering system is preferred to be set by hand. The driver could operate the propulsive system by pressing the second switch 85.

Figure 12:
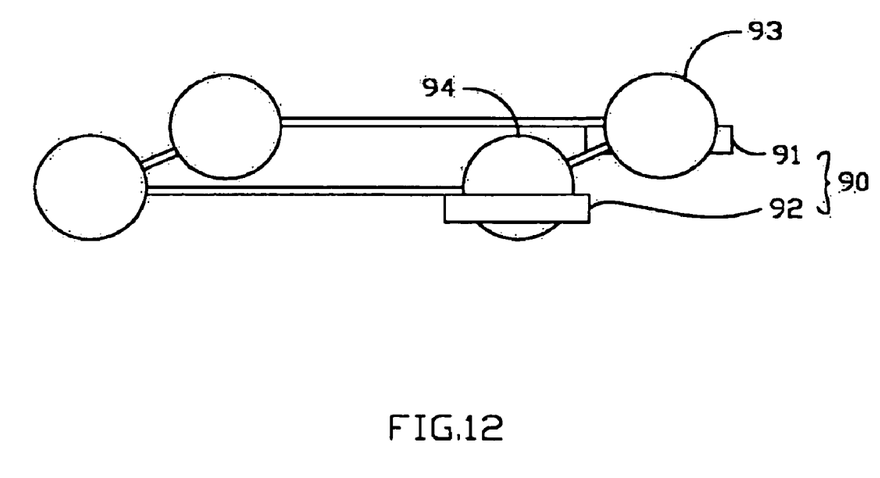
FIG. 12 is a schematic drawing of a steering system.
Figure 13:
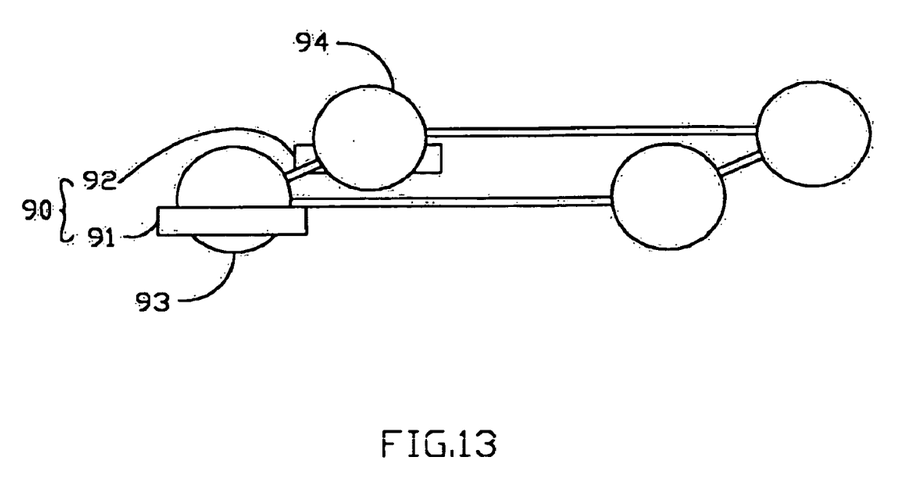
FIG. 13 is a schematic drawing of a steering system.

The three dimensional views of the steering system 90 are shown in FIG. 12 and FIG. 13. The steering system 90 includes a first steering board 91 and a second steering board 92. The first steering board 91 is fixed on a first felly 93. The second steering board 92 is fixed on a second felly 94. When a driver turns the steering wheel of an automobile to control the direction of the automobile, the automobile may be guided by the front wheels, or by the rear wheel. If the automobile is guided by the front wheels, i.e. the first steering felly 93 and the second steering felly 94, the steering system 90 should be fixed on the front wheels. If the automobile is guided by the rear wheels, the steering system 90 should be fixed on the rear wheels. The shape of the steering system 90, i.e. the first steering board 91 and the second steering board 92, is only limited by the steerage of the steering system 90 so that the steering system 90 may be a pair of flat boards or boards with any shape that can guide the automobile on water.

When the automobile has floated on water due to the envelopes, the driver of the automobile could press the second switch 85 to operate the propulsive system. The battery 60 provides the power to operate the propulsive system through the fifth circuit 72 after the propulsive system receiving the second operating signal through the sixth circuit 77. The envelopes float the automobile and the propulsive system propels the automobile floated on water. The driver controls the steering wheel for controlling the steering system to drive the automobile to a dry place to avoid loss due to an immersed automobile.

The driver could press the first switch 70 to operate the pneumatic system 55 to rapidly replenish the envelopes and float the automobile while the automobile being turned on. When the driver wants to drive the automobile on water, the driver could fix the first steering board 91 and the second steering board 92 on the first felly 93 and the second felly 94 respectively and press the second switch 85 to operate the propulsive system 75. The automobile will be moved on water by the propulsive system 75 and will be guided by the steering system 90, wherein the steering system 90 is controlled by the steering wheel at stop gear. The driver could effuse air stored inside the envelopes from the exhaust valves of the envelopes to store and reuse the envelopes after the automobile being parked on a dry place.

The system of the present invention can be set on a recreational automobile, i.e. sport-utility-vehicle, for floating and moving the recreational automobile on water to increase the recreational ability. Because the envelopes float the automobile, the steering system could guide the direction of the automobile and the propulsive system could propel the automobile on water. Of course, the system of the present invention could be set on an automobile without a steering system and a propulsive system to save money of the driver.

The present invention provides a system for preventing an automobile from being immersed in water to avoid loss in an immersed automobile. The system of the present invention comprises holder assemblies, a detecting sensor for detecting the water level, a pneumatic system, envelopes, a propulsive system using in water, and a steering system using in water. The holder assemblies are usually fixed on the beams, that parallel with each other, of the automobile. The pneumatic system is connected to air inlets of the envelopes with pipes and is connected to a battery of the automobile with a first circuit. The envelopes are fixed at the bottoms of the holder assemblies. When the pneumatic system operates, the envelopes start to expand to let the automobile float on water, wherein the envelopes comprise exhaust valves. The detecting sensor connects to the pneumatic system with a second circuit and connects to the battery with a third circuit. The detecting sensor further connects to a first switch with a fourth circuit. The propulsive system using in water connects to the battery with a fifth circuit and connects to a second switch with a sixth circuit. The steering system using in water comprises a first steering board and a second steering board, wherein the first steering board and the second steering board are fixed on a first felly and a second felly of the automobile respectively. The driver inserts the key to turn on the automobile, the detecting sensor receives a signal transported from the third circuit and then stops detecting the water level and expanding the envelopes while driving. The detecting sensor receives another signal transported from the third circuit and starts detecting the water level to prevent the automobile from being immersed in water when the automobile is parked and is turned off. If the detecting sensor detects the water level being too high, the detecting sensor transported a first operating signal to the pneumatic system through the second circuit to float the automobile. Namely, the first operating signal is transported to the pneumatic system when the exhaust pipe of the automobile or the bottom of the door is going to be immersed. The pneumatic system obtains the electric power from the battery of the automobile through the first circuit to replenish the envelopes when receives the first operating signal. The envelopes expand to float the automobile and prevent the automobile from being immersed in water due to air replenished from the air inlets that connect to the pneumatic system with the pipes. When the automobile has floated on water due to the envelopes, the driver of the automobile could press the second switch to operate the propulsive system. The battery provides the power to operate the propulsive system through the fifth circuit after the propulsive system receiving the second operating signal through the sixth circuit. The envelopes float the automobile and the propulsive system propels the automobile floated on water. The driver controls the steering wheel for controlling the steering system to drive the automobile to a dry place to avoid loss due to an immersed automobile. The driver could press the first switch to operate the pneumatic system to rapidly replenish the envelopes and float the automobile while the automobile being turned on. The driver could effuse air stored inside the envelopes from the exhaust valves of the envelopes to store and reuse the envelopes after the automobile being parked on a dry place. The pneumatic system further includes a pressure sensor for sensing the pressure inside the envelopes. The pneumatic system stops replenishing the envelopes to prevent the envelopes from exploded when the pressure inside the envelopes increases upon a predetermined pressure. The system of the present invention could be set on an automobile without a steering system and a propulsive system to save money of the driver. The system of the present invention not only prevents an automobile from being immersed in water to avoid loss in an immersed automobile but also floats the automobile on the water to increase the recreational ability of the automobile.

The above description only demonstrates and illustrates the preferred embodiments of the present invention, but does not limit the scope of the present invention to what described detailed herein; and any equivalent variations and modifications of the present invention should be within the scope of the claims hereafter.

What is claimed is:

1. A system for preventing an automobile from being immersed in water, comprising:
    a first holder assembly being fixed on a first beam of said automobile with a first angle;
    a second holder assembly being fixed on a second beam of said automobile with a second angle;
    a first envelope being fixed at a bottom of said first holder assembly, wherein said first envelope including a first air inlet;
    a second envelope being fixed at a bottom of said second holder assembly, wherein said second envelope including a second air inlet;
    a pneumatic system including a first pipe and a second pipe, wherein said pneumatic system connecting to said first air inlet with said first pipe and connecting to said second air inlet with said second pipe;
    a battery connecting to said pneumatic system with a first circuit;
    a detecting sensor connecting to said battery with a second circuit and connecting to said pneumatic system with a third circuit; and
    a first switch connects to said detecting sensor with a fourth circuit.

2. The system for preventing an automobile from being immersed in water according to claim 1, wherein said first holder assembly may be replaced by a first plate.

3. The system for preventing an automobile from being immersed in water according to claim 1, wherein said second holder assembly may be replaced by a second plate.

4. The system for preventing an automobile from being immersed in water according to claim 1, wherein said first envelope including a first exhaust valve.

5. The system for preventing an automobile from being immersed in water according to claim 1, wherein said second envelope including a second exhaust valve.

6. The system for preventing an automobile from being immersed in water according to claim 1, wherein said first angle equals said second angle.

7. The system for preventing an automobile from being immersed in water according to claim 1, wherein said first beam parallels said second beam.

8. The system for preventing an automobile from being immersed in water according to claim 1, wherein said automobile further comprises a third beam.

9. The system for preventing an automobile from being immersed in water according to claim 8, wherein said third beam connects with said first beam and said second beam.

10. The system for preventing an automobile from being immersed in water according to claim 8, wherein said third beam comprises a third holder assembly.

11. The system for preventing an automobile from being immersed in water according to claim 10, wherein said third holder assembly comprises a third envelope.

12. The system for preventing an automobile from being immersed in water according to claim 8, wherein said automobile further comprises a fourth beam.

13. The system for preventing an automobile from being immersed in water according to claim 12, wherein said fourth beam connects with said first beam and said second beam.

14. The system for preventing an automobile from being immersed in water according to claim 12, wherein said fourth beam comprises a fourth holder assembly.

15. The system for preventing an automobile from being immersed in water according to claim 14, wherein said fourth holder assembly comprises a fourth envelope.

16. The system for preventing an automobile from being immersed in water according to claim 1, comprising a pressure sensor for sensing the pressure inside said envelope.

17. A system for preventing an automobile from being immersed in water, comprising:
   a holder assembly being fixed on beams of said automobile, wherein said beams parallel to each other;
   an envelope being fixed at a bottom of said holder assembly, wherein said envelope including an air inlet;
   a pneumatic system including a pipe to connect with said air inlet and replenishing said envelope with air by connecting to a battery with a first circuit;
   a detecting sensor connecting to said battery with a second circuit and detecting the water level by connecting to said pneumatic system with a third circuit;
   a first switch connecting to said detecting sensor with a fourth circuit to operate said pneumatic system; and
   a steering system of using in water including a first steering board and a second steering board to guide said automobile in water, wherein said first steering board is fixed at a first felly of said automobile and said second steering board is fixed at a second felly of said automobile.

18. The system for preventing an automobile from being immersed in water according to claim 17, wherein said holder assembly may be replaced by a plate.

19. The system for preventing an automobile from being immersed in water according to claim 17, wherein said envelope including an exhaust valve.

20. The system for preventing an automobile from being immersed in water according to claim 17, wherein said first felly and said second felly are a guiding device for controlling the direction when said automobile runs forward on a road.

21. The system for preventing an automobile from being immersed in water according to claim 17, wherein said envelope is an elastic material.

22. The system for preventing an automobile from being immersed in water according to claim 17, wherein said envelope is expanded when said pneumatic system replenishes said envelope with air through said pipe.

23. A system for preventing an automobile from being immersed in water, comprising:
   a first plate being fixed on a first beam of said automobile with a first angle;
   a second plate being fixed on a second beam of said automobile with a second angle;
   a first envelope being fixed at a bottom of said first plate to float said automobile, wherein said first envelope including a first air inlet;
   a second envelope being fixed at a bottom of said second plate to float said automobile, wherein said second envelope including a second air inlet;
   a pneumatic system including a first pipe and a second pipe, wherein said pneumatic system replenishes said envelope with air by connecting to said first air inlet through said first pipe and connecting to said second air inlet through said second pipe;
   a battery connecting to said pneumatic system with a first circuit;
   a detecting sensor detecting the water level by connecting to said battery with a second circuit and connecting to said pneumatic system with a third circuit;
   a first switch operating said pneumatic system by connecting to said detecting sensor with a fourth circuit;
   a steering system of using in water including a first steering board and a second steering board to guide said automobile in water, wherein said first steering board is fixed at a first felly of said automobile and said second steering board is fixed at a second felly of said automobile;
   a propulsive system of using in water propelling said automobile by connecting with a fifth circuit when said automobile floats on water; and
   a second switch operating said propulsive system by connecting with a sixth circuit.

24. The system for preventing an automobile from being immersed in water according to claim 23, wherein said first plate may be replaced by a first holder assembly.

25. The system for preventing an automobile from being immersed in water according to claim 23, wherein said second plate may be replaced by a second holder assembly.

26. The system for preventing an automobile from being immersed in water according to claim 23, wherein said first plate and said second plate may be just replaced by a third plate.

27. The system for preventing an automobile from being immersed in water according to claim 26, wherein said third plate is fixed on both said first beam and said second beam.

28. The system for preventing an automobile from being immersed in water according to claim 23, wherein said first envelope including a first exhaust valve.

29. The system for preventing an automobile from being immersed in water according to claim 23, wherein said second envelope including a second exhaust valve.

30. The system for preventing an automobile from being immersed in water according to claim 23, wherein said first envelope and said second envelope may be just replaced by a third envelope.

31. The system for preventing an automobile from being immersed in water according to claim 23, wherein said first angle equals said second angle.

32. The system for preventing an automobile from being immersed in water according to claim 23, wherein said first beam parallels said second beam.

33. The system for preventing an automobile from being immersed in water according to claim 23, wherein said first felly and said second felly are a guiding device for controlling the direction when said automobile runs forward on a road.

34. The system for preventing an automobile from being immersed in water according to claim 23, wherein said propulsive system including an electromotor.

35. The system for preventing an automobile from being immersed in water according to claim 23, wherein said propulsive system including a propeller.

36. The system for preventing an automobile from being immersed in water according to claim 23, wherein the shape of said first steering board is flat.

37. The system for preventing an automobile from being immersed in water according to claim 23, wherein the shape of said second steering board is flat.

* * * * *